UNITED STATES PATENT OFFICE.

GRACE COCKRELL, OF NIAGARA FALLS, NEW YORK.

BREAKFAST FOOD.

1,173,932. Specification of Letters Patent. Patented Feb. 29, 1916.

No Drawing. Application filed December 8, 1915. Serial No. 65,781.

*To all whom it may concern:*

Be it known that I, GRACE COCKRELL, a citizen of the United States, residing at Niagara Falls, in the county of Niagara and State of New York, have invented a Breakfast Food, of which the following is a specification.

This invention relates to an improved food compound which is intended for use as a breakfast porridge.

The object of this invention is to produce a palatable, nutritious, easily digested breakfast food.

In preparing my improved food I use pure hard winter wheat bran, yellow corn meal and oat flour, the proportions of each being sixty per cent. wheat bran, twenty-five per cent. corn meal, and fifteen per cent. oat flour. These ingredients, after being thoroughly mixed into a food are to be put into cartons and hermetically sealed ready for market.

As is well known wheat bran is an excellent laxative and when combined with the other cereals it becomes palatable. The corn meal contains protein, fats and carbohydrates, and the oat flour also contains a large per cent. of protein for tissue building and blends well with the other cereals adding much to the flavor. This food is especially beneficial for people suffering from indigestion and it is also an excellent food for children.

I claim:

A cereal food consisting of about twelve parts wheat bran, five parts cornmeal, and three parts oat flour.

MRS. GRACE COCKRELL.

Witnesses:
MARY TRAVERSE,
E. M. LOUGHBOROUGH.